United States Patent
Schriever

(10) Patent No.: US 6,702,246 B1
(45) Date of Patent: Mar. 9, 2004

(54) MACHINE LEVELER

(76) Inventor: Frederick G. Schriever, 64 Claireview Rd., Grosse Pointe Shores, MI (US) 48236

( * ) Notice: Subject to any disclaimer, the term of this patent is extended or adjusted under 35 U.S.C. 154(b) by 0 days.

(21) Appl. No.: 09/242,015

(22) PCT Filed: May 23, 1995

(86) PCT No.: PCT/US95/06436

§ 371 (c)(1), (2), (4) Date: Feb. 2, 1999

(87) PCT Pub. No.: WO96/37729

PCT Pub. Date: Nov. 28, 1996

(51) Int. Cl.[7] .................................................. F06B 7/28
(52) U.S. Cl. ....................................... 248/656; 254/104
(58) Field of Search ................................ 248/649, 650, 248/656, 188.4, 188.2; 254/88, 92, 98, 128, 104

(56) References Cited

U.S. PATENT DOCUMENTS

| | | | | |
|---|---|---|---|---|
| 1,794,798 A | * | 3/1931 | Sarr | 254/104 |
| 3,306,562 A | * | 2/1967 | Bellefleur | 248/188.2 |
| 3,390,862 A | * | 7/1968 | Schrepfer | 254/104 |
| 3,774,352 A | * | 11/1973 | Weber | 451/406 |
| 3,829,078 A | * | 8/1974 | Claycomb | 269/310 |
| 4,067,564 A | * | 1/1978 | Kobane, Jr. | 269/310 |
| 4,436,268 A | * | 3/1984 | Schriever | 248/188.3 |
| 4,559,986 A | * | 12/1985 | Svensson et al. | 144/208.9 |
| 4,790,515 A | * | 12/1988 | Pocci | 254/104 |
| 5,090,664 A | * | 2/1992 | McCullough et al. | 254/104 |
| 5,090,924 A | * | 2/1992 | Pfaller et al. | 439/807 |
| 5,762,312 A | * | 6/1998 | Whittaker | 248/663 |
| 6,328,282 B1 | * | 12/2001 | Haney et al. | 254/104 |

* cited by examiner

Primary Examiner—Leslie A. Braun
Assistant Examiner—Kofi Schulterbrandt
(74) Attorney, Agent, or Firm—Brooks & Kushman P.C.

(57) ABSTRACT

A leveling device for heavy loads having a weldable base (10) and a cast iron cover (12) secured thereto with a wedge (32) disposed within the cover (12) and slidably supported on the base (10), a wedge follower (58) resting on the wedge (32) and extending through the cover (12), a spherical washer (106) seated at an upper end of the wedge follower (58), an adjusting screw (82) for adjusting the position of the wedge (32) within the cover (12), and a wedge position indicator (96) extending upwardly through the cover (12) to show the position of the wedge (32) therewithin.

11 Claims, 2 Drawing Sheets

MACHINE LEVELER

Field of Invention

This invention relates to leveling devices and particularly to such devices for mounting and leveling heavy loads.

Background of the Invention

Machine levelers in various forms have been sold over the years whose designs are represented by the following U.S. Pat. Nos. 1,987,726 4,114,845 2,819,037 4,576,357 3,306,562 4,858,865 3,325,145 5,110,082

Certain improvements, however, are desirable, such as, for example, being able to weld the leveling device to steel beams in the floor of the building. Heretofore the leveling devices have had cast iron bases or housings which do not lend themselves to welding and had to be secured to the floor by screws as in U.S. Pat. Nos. 1,987,726, 3,325,145 or 5,110,082, or simply grouted in place in the floor. Also, the design of the prior art levelers was such that if a customer wanted other than a standard size base, it was difficult to provide another size base without a substantially greater price. In addition, it is desirable that the leveler it be able to shed water, cutting oils and scrap shavings, water and the like without allowing it to enter the leveler to cause rusting or malfunction should it be necessary in the future to re-level the load.

A serious problem has been that in adjusting the levelers to level the load, the workmen may over-torque the adjusting screws causing them to break or strip the threads or causing the leveling wedge to break. When such occurs the load, such as a machine tool or other heavy object, must be removed, then the leveler removed and either repaired or replaced, and the load again placed thereon, and the leveling procedure re-commenced, all of which substantially increases the cost of the installation.

Summary Of The Invention

I have overcome the forgoing problems of the prior art and at the same time reduced the cost of the leveler. This is accomplished by making the base of the leveler of a flat steel plate, which may be of any size desired by the customer. The upper face of this plate provides a wedge supporting surface. A hollow cover, which may be cast iron, is placed with its open face against the upper face of the base plate and screw fasteners extend through the cover and are threaded into the plate to secure the two parts together. A wedge is disposed inside the cover and rests on the upper face of the base plate. A wedge follower projects through the top of the cover, being guided therein for vertical movement, and having at its upper end an upwardly facing spherically curved load carrying surface, and at its lower end an inclined surface slidably bearing against the wedge. A wedge shifter in the form of a threaded adjusting screw extends through an end of the cover and engages the wedge to shift it to cause a rise or fall of the wedge follower. A wedge position indicator fastened to the wedge projects through the cover to indicate the position of the wedge therein. Finally, the upper surface of the cover is shaped to cause water or the like falling on the leveler to run off without entering the interior.

Brief Description Of The Preferred Embodiment

Figure 1:
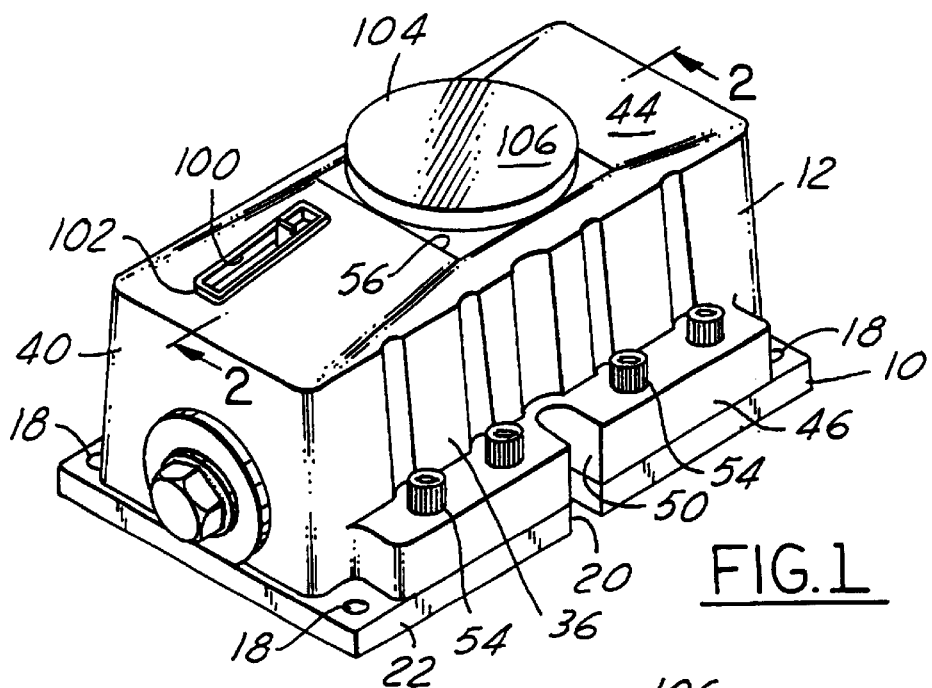
FIG. 1 is a perspective view of a leveler embodying my invention.

The leveler, as shown in the drawings, has a steel base plate 10 which may be of any desired size to carry the load. It is shown in the drawings as being just large enough to accommodate the cover 12, and while it should be no smaller, it can be substantially larger. The leveler design permits a customer to order the leveler with either a standard base, such as shown in FIG. 1, or any larger size base desired. Because the base is made of steel, it can be welded, as at 14, to a structural part 16 of the building in which the leveler is installed, or it can be installed with concrete anchors or other fasteners (not shown) as in the prior art. Threaded holes 18 at each of the corners of the plate, are provided for threadedly receiving therethrough levelling screws to level the base prior to grouting it in place in the concrete floor. Slots 20, one in each edge 22 and 24 are adapted to permit fasteners to be attached to the leveler to hold it down to the structure of the building. Prior art levelers are not designed to afford this flexibility in the method of installing the levelers.

The base plate 10 has an upwardly facing surface 26 and an opposite downwardly facing surface 28. The upwardly facing surface has a wedge supporting surface 30 upon which a wedge 32 is slidably seated. The wedge supporting surface may have a smoother finish than the remainder of the plate to reduce the sliding resistance of the wedge on the plate.

The cover 12 is preferably formed of gray iron for casting purposes, though it may also be formed of ductal iron or steel, and is hollow as shown having an open side 34 that allows the cover to be positioned on the base plate 10 with the open side thereagainst. Thus the cover extends over the wedge 32 and wedge supporting surface 30 and other components to be later described. The cover has four integral side walls 36; 38, 40 and 42 and a top wall 44. The side walls are arranged in opposite pairs and slope outwardly as they extend downwardly. The pair of walls 36 and 38 are longer than the other pair, and terminate in heavy laterally extending integral flanges 46 and 48, each of which is interrupted by a slot 50 which aligns with the slots 20 in the base plate. Flanges 46 and 48 are also provided with a plurality of through openings to receive therethrough, cap screws or the like 54 which are threaded into the base plate for securing the cover thereto.

Figure 4:
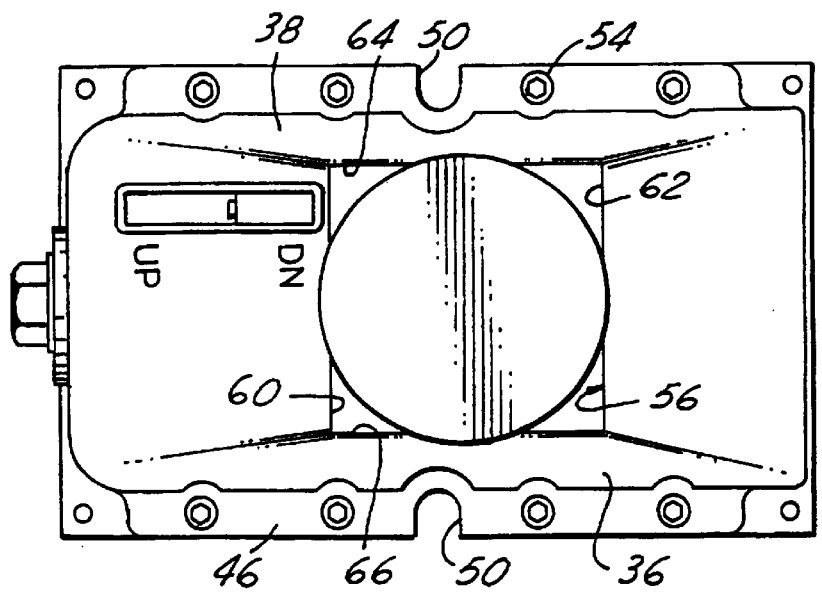
FIG. 4 in a plan view of my improved leveler.
Figure 5:
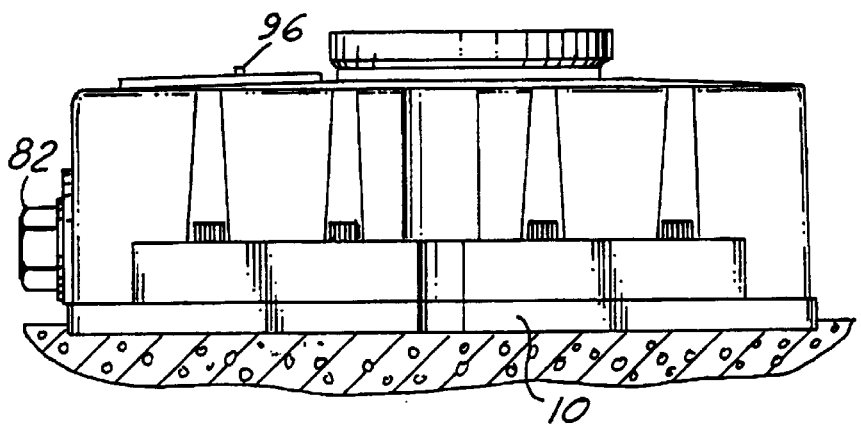
FIG. 5 is a side elevation of the leveler in r the floor of building structure.

The top wall 44 has a central opening 56 therein for slidably receiving and guiding a wedge follower 58 for vertical movement through the cover. The top wall 44 slopes outwardly and downwardly from the central aperture 56 as shown in FIG. 1. The opening 56 is substantially square in plan view as shown in FIG. 4 having peripheral edges 60, 62, 64 and 66. In the embodiment depicted, the edges 60 and 62 are slightly longer than the edges 64 and 66. The wedge follower is substantially square in plan view, having sides 68, 70, 72 and 74. In embodiment depicted the sides 72 and 74 are slightly longer than the sides 68 and 70. There is slight gap, on the order of 1/16", between the sides of the wedge follower and the adjacent peripheral edges 60, 62, 64 and 66 of the central opening 56 to allow free but guided vertical movement of the follower in the cover. Such guiding of the follower 58 insures that it maintains its proper position in relation to the leveler and the wedge 32 and prevents any appreciable lateral movement of the wedge follower 58. The wedge follower is preferably made of cast iron and has a downwardly facing inclined load bearing surface 59.

Figure 3:
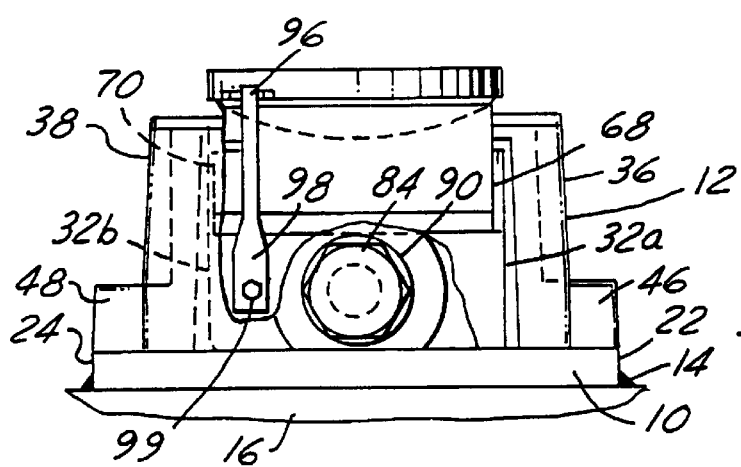
FIG. 3 is an end view of the leveler looking in the direction of arrows 3—3 in FIG. 2.

The wedge 32 is made of the same material as the cover 12 and has a downwardly facing load bearing surface 78 which slidably bears upon the wedge supporting surface 30 of the base plate 10, and an upwardly facing inclined load bearing surface 80. The surfaces 59, 78 and 80 may be machined to a smooth surface to reduce the sliding friction between the wedge, base plate 10 and the wedge follower 58. The inclined load bearing surfaces 59 and 80 lie at a self-locking angle such as 10 degrees. It will be noted in FIG. 3 that opposed side walls 36 and 38 of the cover 12 embrace the sides 32a and 32b of the wedge in closely spaced relation to guide the wedge for rectilinear movement during sliding of the wedge on the base 10 within the cover.

Figures 6, 7:
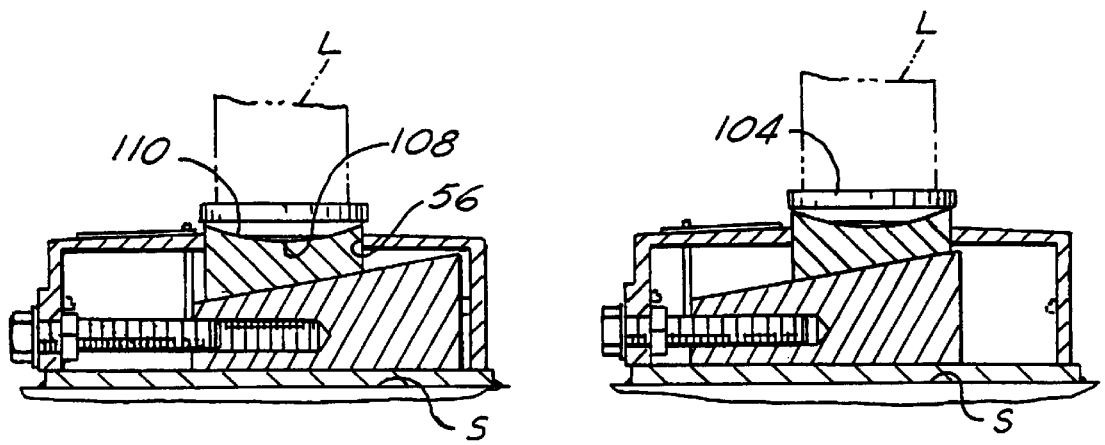
FIGS. 6 and 7 are cross-sectional views similar to FIG. 2 showing the wedge in different adjusted positions.

A wedge shifter in the form of a threaded adjusting screw 82 extends through the side wall 40 of the cover and has a tool engaging hexagonal head portion 84 on the outside of the cover with a long threaded body 86 threadedly engaged in a threaded bore 88 in the wedge. A thrust washer 90 encircles the body 86 between the head portion 84 and the outside of wall 40 and a jam nut 92 on the body 86 bears against the inside of wall 40. The threaded body 86 of the shifter and bore 88 are sufficiently long that upon applying a wrench (not shown) to the tool engaging head portion 84 and rotating the shifter, the wedge may be shifted between the fully raised position shown in FIG. 7 and the fully lowered position shown in FIG. 6.

To show the adjusted position of the wedge within the cover, an indicator 94 is connected to the wedge and projects out through the cover 12. In one preferred embodiment, the indicator 94 may be in the form of a finger having a narrow upper end 96 and an wider lower end 98. A small screw fastener 99 extends through the lower end portion of the finger and secures it to the wedge. The upper end extends through a slot 100 in the top of the cover. The slot is surrounded at the outer surface of the cover by a raised portion or ridge 102 which will help keep water or cutting oil that may drip on the cover out of the slot. The cover may be marked with the legends UP and DN. The indicator 94 will show the workman adjusting the leveler to level a heavy load when he is at or near the limit of travel of the wedge, thereby avoiding over torquing the wedge shifter and consequent damage to the shifter or the wedge itself.

Figure 2:
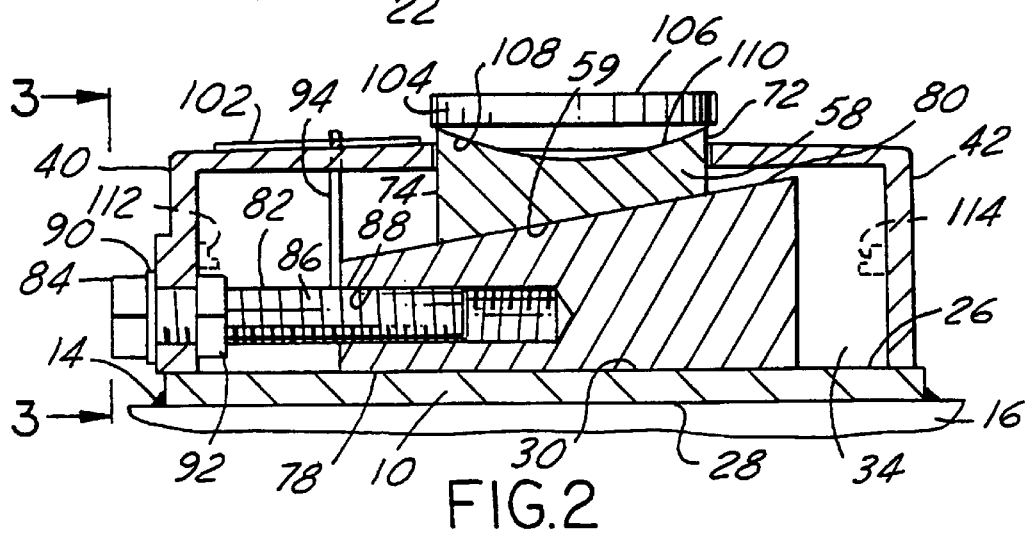
FIG. 2 is a cross-sectional view taken on the line 2—2 of FIG. 1.

In an alternative embodiment the wedge position indicator may comprise a pair of electric contact switches 112 and 114 shown in phantom outline in FIG. 2. These are connected in an electric circuit (not shown) to a meter (not shown) that will indicate a close approach of the wedge to either wall 40 or 42.

At the upper end of the wedge follower 58 is a load carrying member in the form of a cast iron spherical washer 104. The washer has a flat upwardly facing load bearing surface 106 and a downwardly facing spherically curved load bearing surface 108 which complements a spherically curved upwardly facing spherical seat 110 in the wedge follower. This arrangement allows leveling of a load indicated in phantom at L in FIGS. 6 and 7 despite a slight inclination of the surface S on which the leveler is mounted.

Thus I have shown a leveler which still utilizes cast iron or ductal iron or steel for the wedge, wedge follower, spherical washer and housing, or cover, but enables the leveler to be welded in place and permits the flexibility of varying size bases rather than being limited, as a practical matter, to one standard base. In addition the design is such that water and cutting oil are essentially excluded from the leveler, and during leveling of a heavy load the workman can easily see the location of the wedge within the leveler and thereby avoid damaging it.

I claim:

1. A leveling device for mounting and leveling heavy loads comprising, in combination:
   a weldable base having a flat upwardly facing wedge supporting surface;
   a hollow cast iron cover having four integral side walls arranged in opposed pairs, and a top wall integral with the side walls at the upper edges of the side walls, and flanges at the lower edges of one of the opposed pairs of side walls and extending laterally outwardly therefrom;
   said cover being open at that side opposite the top wall and positioned on the base over the wedge supporting surface with the open side against the base;
   screw threaded fasteners extending through said flanges and threadedly connected to the base for securing the cover thereto;
   a wedge disposed within said cover and slidably supported on said upwardly facing surface of the base between the side walls, said wedge having an upwardly facing inclined surface;
   one of the opposed pairs of side walls of the cover embracing sides of the wedge to guide the same for rectlinear movement during sliding of the wedge on the base within the cover;
   an opening in said top wall having a peripheral edge;
   a wedge follower within the cover having a downwardly facing inclined surface complementing the upwardly inclined surface of the wedge and disposed in sliding contact thereagain;
   said wedge follower extending upwardly through said opening in the top wall of the cover and guided for vertical movement by engagement with said peripheral edge during sliding movement of the wedge;
   said follower having an upwardly facing spherically curved seat;
   a load supporting member mounted on the wedge follower and having a downwardly facing spherically curved seat complementing the spherically curved seat of the wedge follower and nesting therewith;
   a wedge shifter extending through the cover and having a tool engaging portion disposed outside the cover and another portion disposed inside the cover and operably engaged with the wedge for shifting it to cause vertical movement of the follower; and
   an indicator finger mounted on the wedge and projecting through the cover and moveable with the wedge for indicating the position of the wedge within the cover.

2. The invention defined by claim 1 wherein said top wall of the cover slopes downwardly from said opening to cause the leveler to shed water and the like dripping thereon.

3. The invention defined by claim 1 wherein said top wall is provided with a slot and said finger projects upwardly therethrough.

4. The invention defined by claim 3 wherein there is a ridge upstanding from the cover around said slot to deflect water and the like on the cover away from said slot.

5. A leveling device for mounting and leveling heavy loads comprising, in combination:

a base plate having an upwardly facing wedge supporting surface;

a hollow cover open at one side positioned on the base plate over the wedge supporting surface with the open side against the plate;

fasteners extending through the cover and engaged with the base plate to hold the cover thereto;

a wedge disposed within the cover and seated on said supporting surface for slidable movement and having an inclined surface;

a wedge follower extending through the cover opposite said open side and having a load carrying surface at the upper end and an inclined surface at the lower end engaged with the wedge within the cover;

said cover having portions engaging the follower for guiding it for vertical movement upon slidable movement of the wedge within the cover;

a wedge shifter extending through the cover and having a tool engaging portion disposed outside the cover and a wedge engaging portion within the cover operably engaged with the wedge such that upon actuating the tool engaging portion the wedge is slidably shifted to vary the height of the load supporting member; and an indicator connected to said wedge and projecting through the cover for indicating the position of the wedge.

6. The invention defined by claim 5 wherein said cover is a top wall and said wedge follower projects therethrough, and the top wall slopes outwardly and downwardly from the wedge follower.

7. The invention defined by claim 5 wherein said cover is made of cast iron and said base plate is weldable steel.

8. The invention defined by claim 5 wherein said cover has portions for engaging both the wedge and the wedge follower for guiding them during slidable movement of the wedge within the cover.

9. A leveling device for mounting and leveling heavy loads comprising, in combination:

a base plate of weldable steel having an upwardly facing wedge supporting surface;

a hollow cover of cast iron open at one side positioned on the base plate over the wedge supporting surface with an open side against the base plate;

fastener means for securing the cover to the base plate;

a wedge disposed within the cover and seated on said supporting surface for slidable movement and having an inclined surface;

a wedge follower extending through the cover opposite said open side and having a load carrying surface at the upper end and an inclined surface at the lower end engaged with the wedge within the cover;

a wedge shifter for slidably moving the wedge to raise or lower the wedge follower; and an indicator connected to the wedge and projecting through the cover for indicating the position of the wedge.

10. The invention defined by claim 9 wherein said cover has portions for engaging both the wedge and the wedge follower to guide their movement during sliding of the wedge.

11. A leveling device for mounting and leveling heavy loads comprising, in combination:

a base plate having an upwardly facing wedge supporting surface;

a hollow cover open at one side positioned on the base plate over the wedge supporting surface with an open side against the base plate;

fastener means for securing the cover to the base plate;

a wedge disposed within the cover and seated on said supporting surface for sliding movement and having an inclined surface;

a wedge follower extending through the cover opposite said open side and having a load carrying surface at the upper end and an inclined surface at the lower end engaged with the wedge within the cover;

a wedge shifter for slidably moving the wedge to raise and lower the wedge follower; and an electrically operated wedge position sensor for indicating the position of the wedge.

* * * * *